July 4, 1939.  L. F. NENNINGER ET AL  2,164,884
OPERATING CONTROL MECHANISM FOR MILLING MACHINES
Filed May 31, 1934   8 Sheets-Sheet 1

Inventor
LESTER F. NENNINGER
ERWIN G. ROEHM
By AHKParsons
Attorney

July 4, 1939.   L. F. NENNINGER ET AL   2,164,884
OPERATING CONTROL MECHANISM FOR MILLING MACHINES
Filed May 31, 1934   8 Sheets-Sheet 2

Fig.2

Inventor
LESTER F. NENNINGER
ERWIN G. ROEHM
By A.H.K. Parsons
Attorney

July 4, 1939.    L. F. NENNINGER ET AL    2,164,884
OPERATING CONTROL MECHANISM FOR MILLING MACHINES
Filed May 31, 1934    8 Sheets-Sheet 3

Inventor
LESTER F. NENNINGER
ERWIN G. ROEHM
By A. H. Parsons
Attorney

July 4, 1939.  L. F. NENNINGER ET AL  2,164,884
OPERATING CONTROL MECHANISM FOR MILLING MACHINES
Filed May 31, 1934  8 Sheets-Sheet 4

Inventor.
LESTER F. NENNINGER
ERWIN G. ROEHM

Attorney

July 4, 1939.　　L. F. NENNINGER ET AL　　2,164,884
OPERATING CONTROL MECHANISM FOR MILLING MACHINES
Filed May 31, 1934　　8 Sheets-Sheet 7

Inventor
LESTER F. NENNINGER
ERWIN G. ROEHM
By A. K. Parsons
Attorney

Patented July 4, 1939

2,164,884

UNITED STATES PATENT OFFICE 2,164,884

OPERATING CONTROL MECHANISM FOR MILLING MACHINES

Lester F. Nenninger, Cincinnati, and Erwin G. Roehm, Norwood, Ohio, assignors to The Cincinnati Milling Machine Company, Cincinnati, Ohio, a corporation of Ohio Application May 31, 1934, Serial No. 728,322

19 Claims. (Cl. 90—18)

This invention relates to milling machines and more particularly to improvements in operating control mechanisms therefor.

One of the objects of this invention is to improve the operation and control of a milling machine whereby changes in the rate of relative movement between the cutter and work may be effected quietly, quickly and efficiently.

Another object of this invention is to eliminate present limitations of power rate change mechanisms for milling machines and so construct the same that the next rate lower than the present rate may be effected by decreasing the present rate one step rather than passing through the whole progression such as is necessary with present devices.

A further object of this invention is to provide a power rate change mechanism for a milling machine which is so arranged that a single lever may be utilized for determining any change in the rate of relative movement between the cutter and work and in either an increasing or decreasing progression.

An additional object of this invention is to provide an improved power operable rate change mechanism for a machine tool transmission which has the capacity not only to change rates by increasing or decreasing the same, but also to impart a slow, steady, positive rate of rotation to the transmission gear train to assist intermeshing of the gears and facilitating the shift.

A still further object of this invention is to provide means for imparting a slow rotation to the gear train during gear shifting which may be operated in properly timed relation in accordance with the diameter and pitch of the particular gears to be intermeshed whereby substantially the same rates of relative movement between a moving gear tooth and a stationary gear tooth is obtained regardless of gear diameters, thereby facilitating intermeshing in a quiet, efficient manner.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts.

Figure 1:
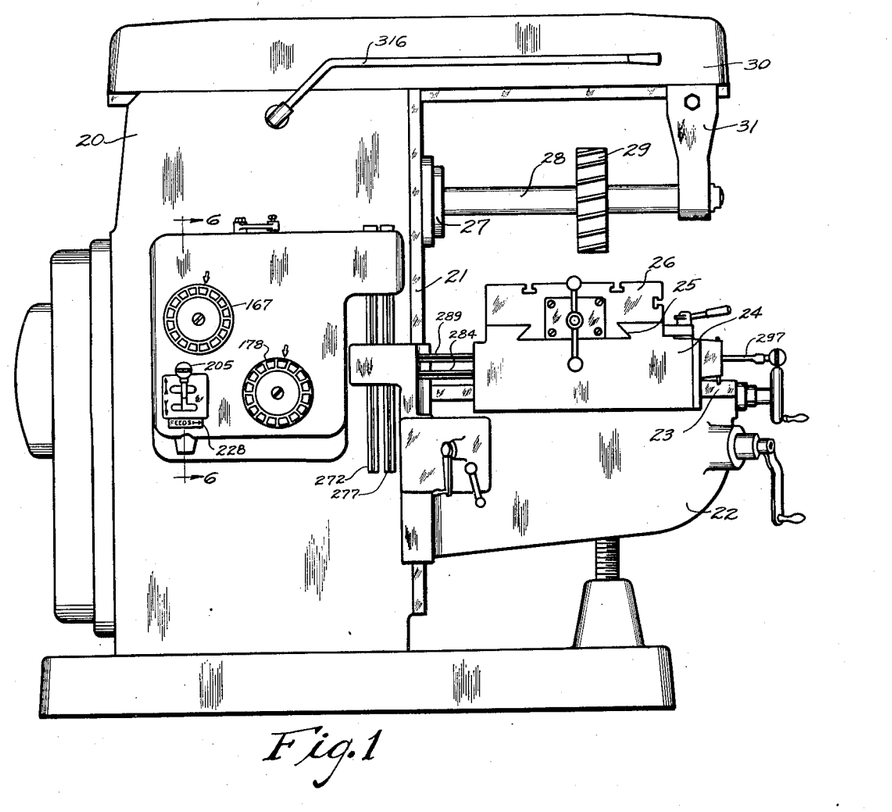
Figure 1 is a view in elevation of a milling machine embodying the princples of this invention.

In the drawings, the reference numeral 20 in Figure 1 indicates the column of a conventional milling machine having guideways 21 formed upon one face thereof for receiving a vertically movable knee 22. The knee has horizontal guideways 23 formed on the upper face thereof for receiving and guiding a saddle 24 for horizontal movement toward and from the column and at right angles to the direction of knee adjustment.

The saddle in turn has guideways 25 formed in the upper face thereof for receiving and guiding a table 26 for transverse adjustment relative to a cutter spindle 27 journaled in the column of the machine. These parts constitute the work supporting organization of the machine.

The spindle 27 is adapted to receive and rotate an arbor 28 upon which a suitable cutter 29 may be mounted for rotation thereby. The outboard end of the arbor may be supported by an overarm 30 which is adjustable in suitable guideways formed in the top of the column and which may be provided with a pendant 31 on the outer end thereof for receiving and journaling the outboard end of the arbor. The above described elements constitute the main parts of a conventional knee and column type milling machine.

Figure 2:
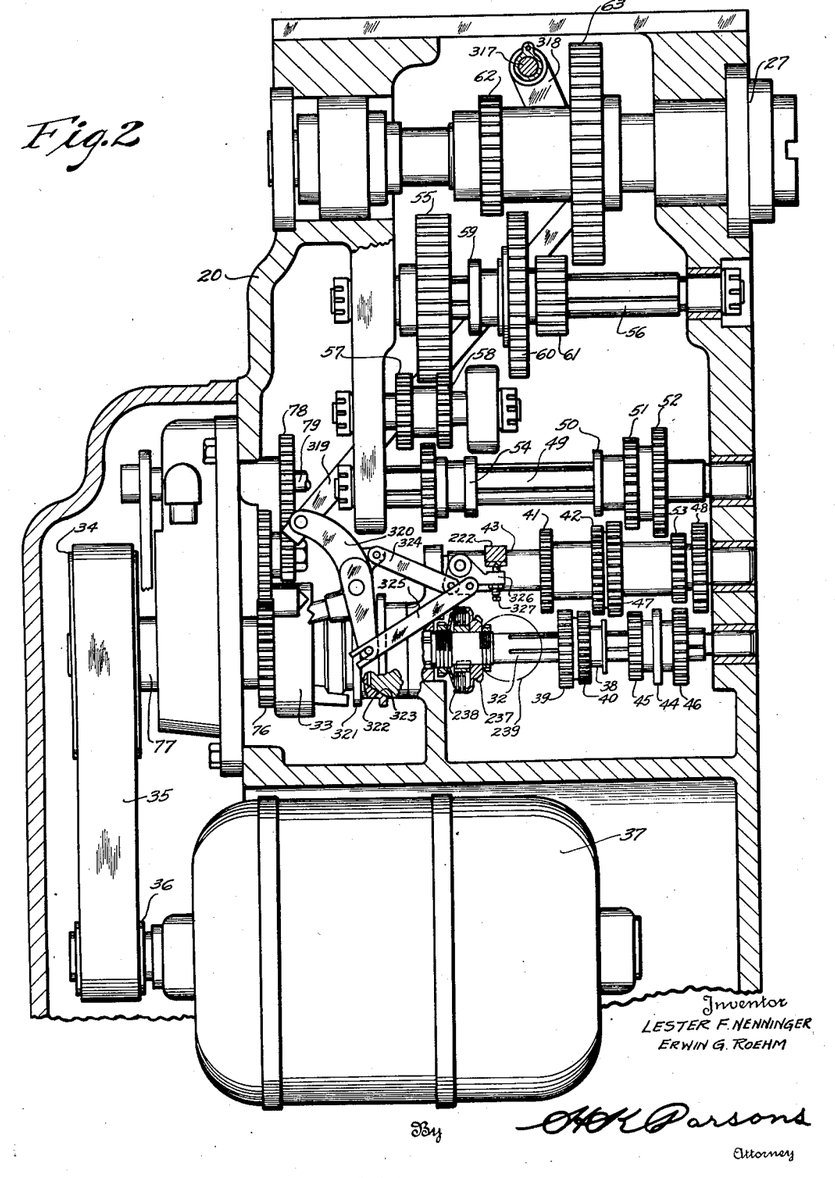
Figure 2 is a vertical section through the column of the machine showing a conventional shiftable gear type of variable speed spindle transmission.

Milling operations are effected by causing relative movement between the cutter and work and to this end the spindle 27 is rotated by a suitable form of shiftable gear variable speed transmission, one form of which is shown in Figure 2. This transmission comprises a main drive shaft 32 which is adapted to be interconnected by a friction disc clutch 33 with the drive pulley 34. In the present instance this pulley is interconnected by a suitable means, such as a belt 35, with the small pulley 36 mounted on the end of the armature shaft of the prime mover such as the electric motor 37. The shaft 32 has a first gear couplet 38 splined thereon comprising gears 39 and 40 shiftable into engagement with gears 41 and 42 respectively and carried by shaft 43. The shaft 32 has a second gear couplet 44 splined thereon and comprising gears 45 and 46 shiftable into mesh with gears 47 and 48 respectively also carried by the shaft 43 and fixed therewith.

A third shaft 49 is journaled in the column and has splined thereon a gear couplet 50 comprising gears 51 and 52 shiftable respectively into mesh with gears 47 and 53 carried by the shaft 43. By means of the three shiftable couplets just described the shaft 32 is capable of imparting eight different rates of rotation to the shaft 49.

The shaft 49 has a second shiftable gear 54 splined thereon which has a first position, such as that shown in Figure 2, in which the gear meshes directly with gear 55 carried by a fourth shaft 56; and a second position in which the gear 54 engages gear 57, the latter having integral therewith a gear 58 of equal size which meshes with the gear 55. This constitutes a mechanism for reversing the direction of rotation of the spindle.

The shaft 56 is splined for receiving the shiftable gear couplet 59 comprising gears 60 and 61 shiftable into engagement with gears 62 and 63 respectively which are carried by the spindle 27. This last gear couplet makes it possible for the shaft 32 to rotate the cutter spindle at any one of sixteen different speeds.

Figures 6, 16:
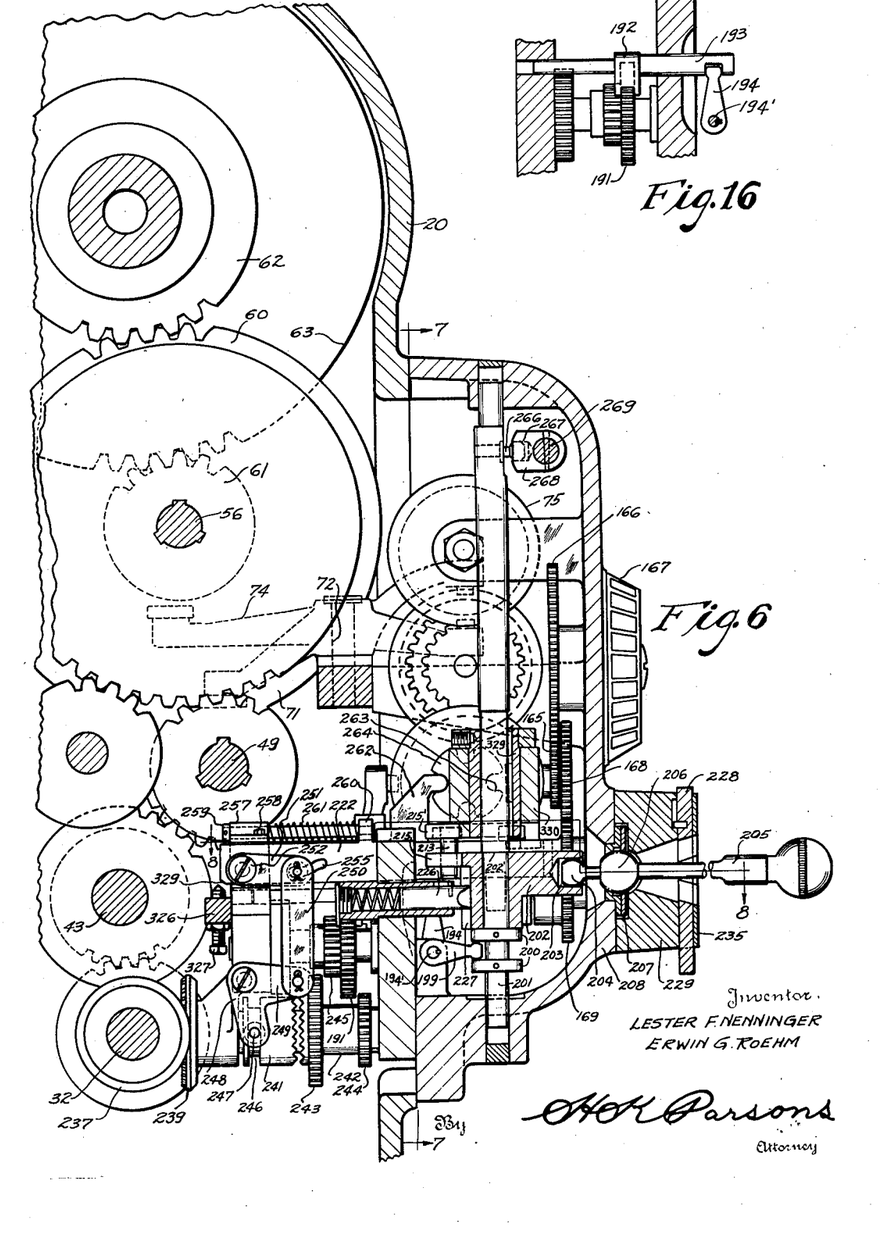
Figure 6 is a section through the control box taken on the line 6—6 of Figure 1.
Figure 16 is a detail view of the reversing mechanism of the power rate change mechanism.
Figure 7:
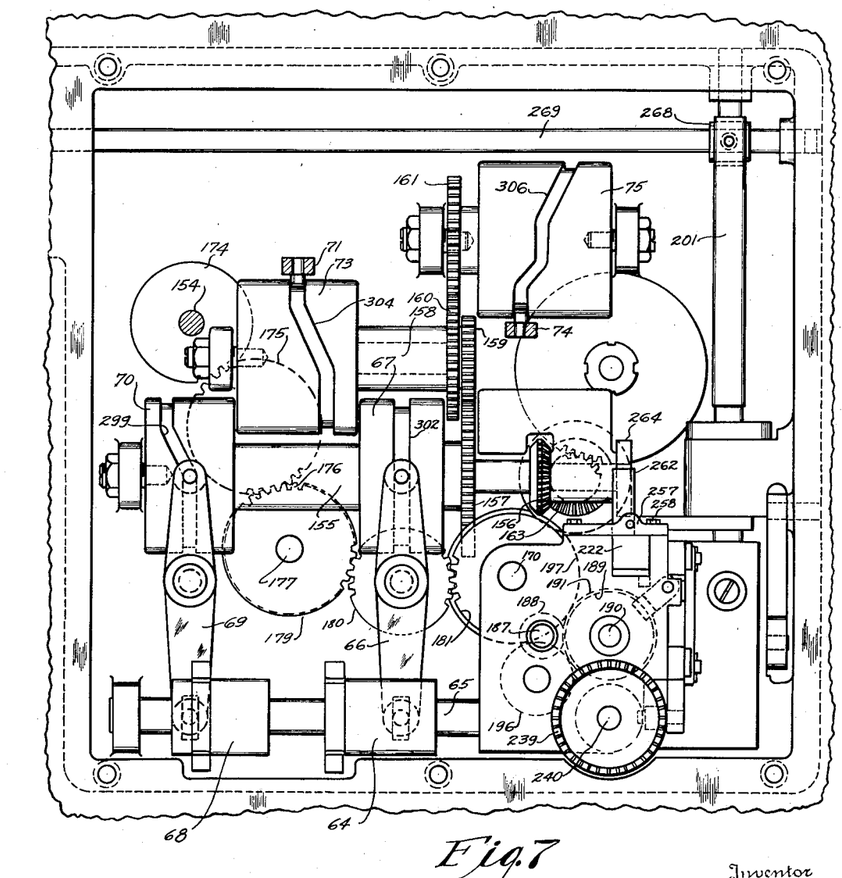
Figure 7 is a section taken on the line 7—7 of Figure 6 showing the control cams for shifting gears of the spindle transmission.

The couplet 38 is shifted by a fork 64, Figure 7, slidably mounted on a guide rod 65 and interconnected by the pivoted lever 66 to a control cam 67. Likewise the couplet 44 is provided with a shifter fork 68 mounted on the rod 65 and interconnected by the pivoted lever 69 to a control cam 70. The couplet 50 mounted on the shaft 49 has a shifter member 71 which is pivotally mounted on a pin 72, as shown in Figure 6, for control by cam 73. The couplet 59 is controlled by a shifter fork 74 which is pivotally mounted, as shown in Figure 6, with one end engaging the groove in cam 75.

Figures 3, 4, 5:
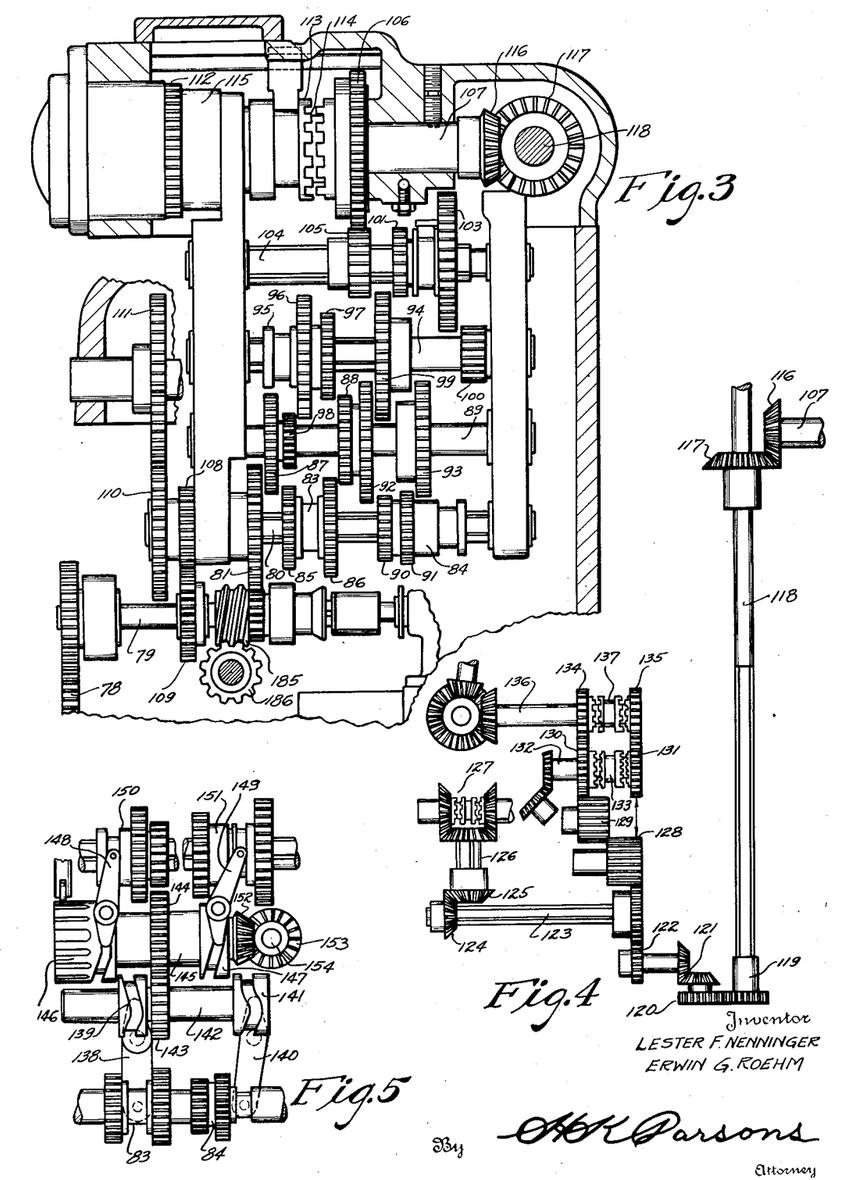
Figure 3 is an expanded view of a shiftable gear type of feed transmission embodied in the machine shown in Figure 1.
Figure 4 is a view showing the gear train which interconnects the feed box with the various movable work supporting members of the machine.
Figure 5 is a view showing the control cams for shifting the gears of the feed transmission.

The table, saddle, and knee are driven through the feed box shown in Figure 3 which receives power from a gear 76 integral with the shaft 77 which supports the pulley 34 and therefore is constantly rotated during operation of the prime mover. The gear 76 is interconnected through the gear train indicated generally by the reference numeral 78 with the shaft 79. This shaft serves to drive the feed transmission and the rapid traverse transmission for the work support organization.

The feed transmission has a primary shaft 80 which is interconnected by gears 81 and 82 to shaft 79 for continuous rotation thereby. The shaft 80 has a first gear couplet 83 and a second gear couplet 84 splined thereon for shifting movement. The couplet 83 comprises gears 85 and 86 shiftable into mesh with gears 87 and 88 respectively carried by shaft 89. Couplet 84 comprises gears 90 and 91 shiftable into mesh respectively with gears 92 and 93 also carried by shaft 89.

A third parallel shaft 94 in the feed transmission has splined thereon a gear couplet 95 comprising gears 96 and 97 shiftable into mesh with gears 98 and 88 respectively and carried by shaft 89. These three couplets make it possible to rotate the shaft 94 at eight different speeds.

The shaft 94 has gears 99 and 100 fixed thereto which are interengaged by gears 101 and 102 of the couplet 103 shiftably mounted on the spline shaft 104. This shaft also carries a gear 105 which is fixed thereto and inter-meshes with gear 106 mounted on the final output shaft 107. By means of this additional couplet the shaft 107 may be rotated at any one of sixteen speeds. The rapid traverse transmission comprises a gear 108 which is constantly driven by the gear 109 fixed on the shaft 79. Mounted on the same shaft with gear 108 is a gear 110 which is connected by an intermediate idler 111 to the final gear 112 of the rapid traverse transmission, the latter being mounted for free rotation on the shaft 107.

A feed-rapid traverse selector clutch 113 is splined on the shaft 107 and is adapted to be interconnected by complementary clutch teeth indicated generally by the reference numeral 114 with the final gear 106 of the feed transmission which is also mounted for free rotation on shaft 107. A friction clutch 115 is interposed between the other face of the clutch 113 and the final drive gear 112 of the rapid traverse transmission for interconnecting the same for actuation of shaft 107. It will now be seen that the feed box has a variable feed transmission therein of the shiftable gear type, and a rapid traverse transmission, and that either of these transmissions may be selectively connected for actuation of the final output shaft 107.

The shaft 107 is connected to the various supports through the following train. A pair of bevel gears 116 and 117 interconnect shaft 107 with the vertical spline shaft 118 carried on the exterior of the column of the machine and inter-engaging a gear 119 which is journaled in the knee 22 and movable up and down therewith. The gear train shown in Figure 4 is mostly carried by the knee and comprises a gear 120 intermeshing with gear 119 for driving through bevel gearing 121 and spur gearing 122 a horizontal spline shaft 123. This shaft has slidably splined thereon a bevel gear 124 which is carried by the saddle and which drives through a bevel gear 125 and shaft 126 a reverser mechanism indicated generally by the reference numeral 127. This reverser mechanism is utilized for selectively connecting the feed box with the table lead screw for actuation thereby in opposite directions.

The spur gearing 122 also drives through intermeshing gears 128 and 129 a pair of gears 130 and 131 but in opposite directions for the reason that the gear 128 meshes directly with gear 131 while the interposed idler 129 changes the direction of rotation of the gear 130. These gears are mounted for free rotation on a shaft 132 and connectible therewith by an intervening clutch 133 for opposite rotation thereof, the shaft 132 being finally connected to the saddle.

The gears 130 and 131 intermesh respectively with gears 134 and 135 mounted for free rotation on the knee drive shaft 136 and intervening clutch 137 serves to connect either of these gears with the shaft. It will now be seen that the shaft 118 may be operatively connected with either the saddle, table, or knee for selective operation of any of these in opposite directions and at different rates depending upon the setting of the clutch and gears in the feed box.

As shown in Figure 5 the gear couplet 83 of the feed transmission is inter-connected by a shifter fork 138 to a control cam 139. Similarly, the shifter 84 is interconnected by the shifter arm 140 to the control cam 141. These cams have suitably formed grooves therein whereby upon a single rotation thereof the four gears of the couplets will be sequentially moved into driving position, there being one in driving engagement for each quarter revolution of the shaft 142 which supports the cams. The shaft 142 is connected by gears 143 and 144 in a two to one ratio to shaft 145. This shaft carries a pair of cams 146 and 147 which serve to control through shifters 148 and 149 the couplets 150 and 151 respectively.

The shaft 145 is interconnected through bevel gears 152 and 153 to a power shaft 154.

This invention contemplates an improved operating control mechanism whereby the shifting cams of both transmissions may be interconnected for control by a single lever and whereby either set of cams may be selectively rotated in either direction so that the desired new rate may be obtained by progressive increase thereto or progressive decrease thereto, thereby reducing the number of intermediate steps to a minimum. Furthermore, the invention contemplates a mechanism which is automatically operable when rate changes are made in one of the transmissions to slowly rotate or jog the same to facilitate intermeshing of the gears.

Figures 13, 14, 15:
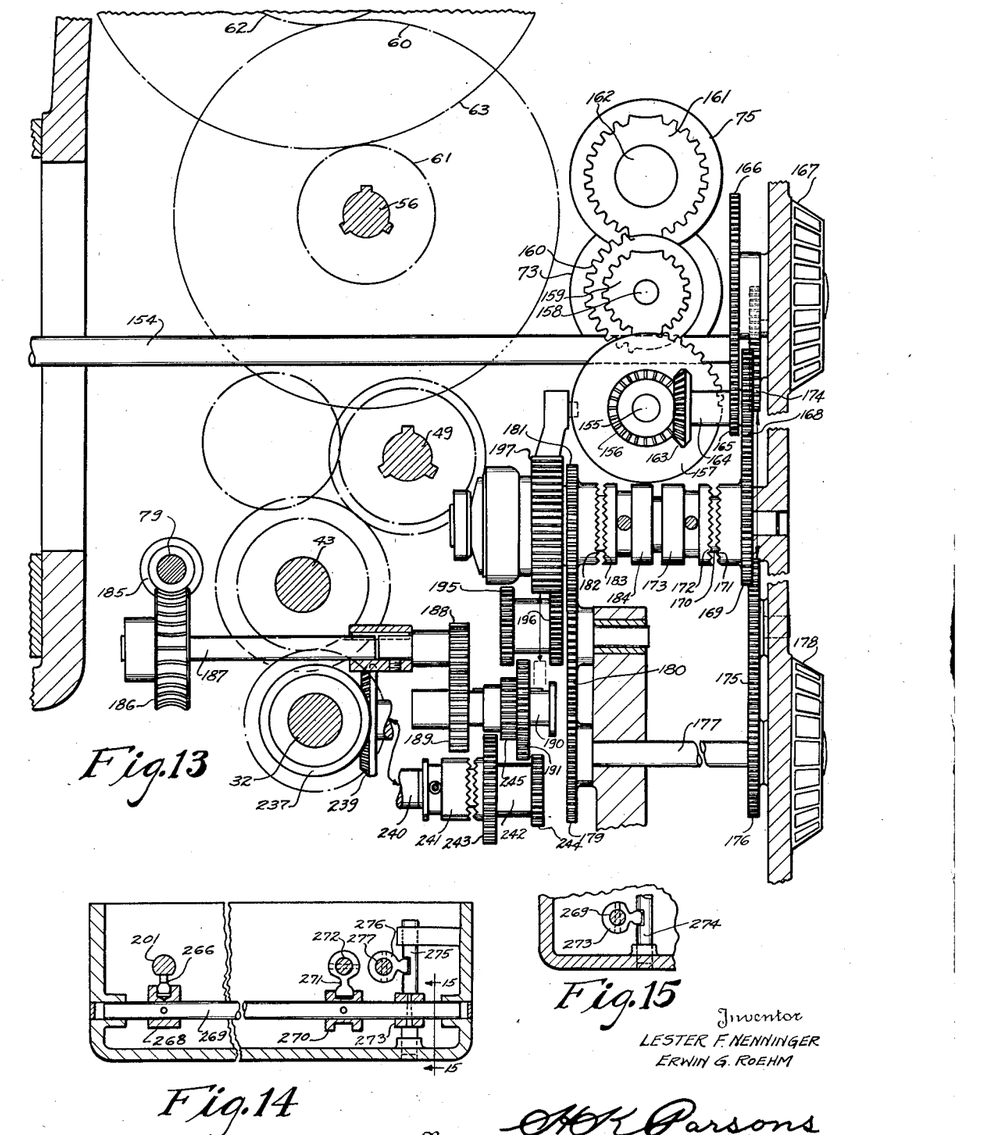
Figure 13 is an expanded view of the power train for shifting gears and jogging the spindle train.
Figure 14 is a section on the line 14—14 of Figure 9.
Figure 15 is a detail section on the line 15—15 of Figure 14.

To this end a shaft 155, Figures 7 and 13, which supports cams 67 and 70 is provided with a first gear 156 through which it receives power, and a second gear 157 of the intermittent type, as shown in Figure 13, having teeth on only one quarter of its periphery. This gear serves to intermittently rotate shaft 158, which bears cam 73, through the mutilated gear 159. The gear 157 is also in a two to one ratio with the gear 159 so that for each revolution of the gear 157 the gear 159 and shaft 158 will be given one-half of a revolution.

The shaft 158 also has an intermittent gear 160 secured thereto, the teeth of which extend around one-half of its periphery for intermeshing with the mutilated gear 161 carried by shaft 162 which supports the cam 75. The gears 160 and 161 are in a one to one ratio but due to the intermittent teeth on gear 160 the shaft 162 will only make one-half a revolution for each revolution of the shaft 158.

The bevel gear 156 on shaft 155 intermeshes with the bevel gear 163 carried by shaft 164. This shaft has a first spur gear 165 which is connected to the large gear 166 for rotating the speed rate indicating dial 167; and a second gear 168 which intermeshes with gear 169 mounted for free rotation on the shaft 170. Gear 169 has clutch teeth 171 formed on the hub thereof for inter-engagement with complementary clutch teeth 172 formed on shiftable clutch member 173.

The drive shaft 154 for the feed rate control cams has a spur gear 174 secured to the end thereof, as shown in Figure 13, which is interconnected by an idler 175 and gear 176 to the dial shaft 177 which shaft has a feed rate dial 178 secured to one end thereof. The shaft 177 has a gear 179 keyed to the other end thereof and inter-connected through the intermediate idler 180 to the spur gear 181 mounted for free rotation on the shaft 170. The gear 181 has clutch teeth 182 formed on the hub thereof for intermeshing with complementary clutch teeth 182 formed on one face of the clutch member 184. The clutches 184 and 173 are splined on the power shaft 170 and selectively shiftable into mesh with their respective gears to cause rotation of either the speed rate control cams or the feed rate control cams.

The shaft 170 is driven from the continuously rotating shaft 79 through the following train: A pair of spiral gears 185 and 186 interconnect shaft 79 with shaft 187 which in turn drives, through spur gears 188 and 189, the shaft 190. The shaft 190 has a shiftable gear 191 splined thereon which has only two positions although it is shown in a midway position in Figure 13, the power transmitting positions being on either side of the position shown. This gear is shifted by a shifter fork 192, Figure 16, fixed with the shifter rod 193 which is interconnected with a crank 194.

The gear 191 has a first position to the left of that shown in Figure 13 in mesh with gear 195 which has integral therewith a gear 196 intermeshing with the drive gear 197 of shaft 170. The gear 197 is connected to the shaft by a multiple disc friction clutch 198 as more particularly shown in Figure 8 and this clutch is set to provide a safety factor so as to permit slippage and prevent damage to the various cams in case anything should happen to prevent proper intermeshing of the gears.

The gear 191 has a position to the right of that shown in Figure 13 for direct intermeshing with gear 197 to rotate the same in an opposite direction. It will thus be seen that this mechanism is really a reversing mechanism for determining the direction of rotation of the shaft 170 and thereby whether the subsequent rates to be effected are attained by progressively increasing or by progressively decreasing the present rate.

The crank arm 194 which shifts the gear 191 is mounted on shaft 194' which has an arm 199 the end of which fits between a pair of collars 200 fixed to the oscillatable and reciprocable shaft 201, Figure 6. This shaft has a freely rotatable arm 202 mounted thereon. The arm is fixed, however, between a collar 200 and a shoulder 202' for axial movement with the shaft. In the end of the arm is formed a socket 203 for receiving the ball end 204 of the manually operable control lever 205 which is supported for universal movement by means of an enlarged ball 206 fitting in the socket 207 carried by the housing 208. It will now be seen that as the lever 205 is moved up or down, it will shift the gear 191 to its various positions.

The shaft 194', which supports arms 194 and 199, also carries a detent member 311 having two notches 312 and 313 engageable by the pivoted detent 314 for holding the parts in either one of two positions. A spring pressed plunger 315, Figures 8 and 10, continuously urges the detent 314 toward the left and insures completion of any shifting movement.

Figures 8, 9, 10, 11, 12:
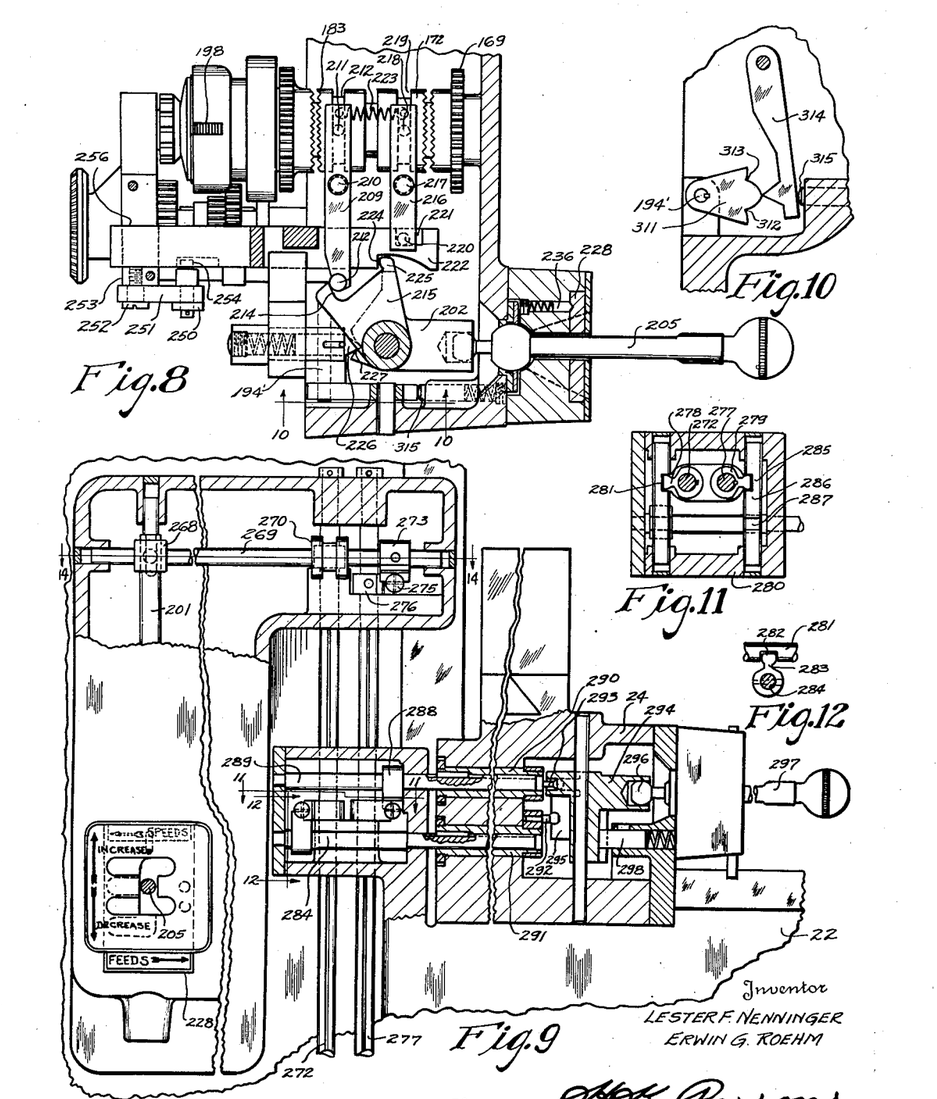
Figure 8 is a detailed section on the line 8—8 of Figure 6.
Figure 9 is an elevational view partly in section showing the mechanism interconnecting the front and rear control levers.
Figure 10 is a detail section on the line 10—10 of Figure 8.
Figure 11 is a detail section on the line 11—11 of Figure 9.
Figure 12 is a detail section on the line 12—12 of Figure 9.

The lever 205 is laterally movable from the position shown in Figure 8, for selectively engaging the feed or speed control clutches 183 and 172. The feed clutch 183 has a shift lever 209 which is centrally pivoted on pin 210, and has a finger 211 in one end thereof engaging the annular groove 212 formed in the clutch member 183. The other end of the lever has a depending pin 213 engageable by the hook-shaped portion 214 of the arm 215 which is integral with the arm 202.

A second shift lever 216 is pivotally mounted on a pin 217 and has a depending finger 218 at one end for engaging the annular groove 219 formed in the clutch member 172. The other end of lever 216 has a pin 220 which depends into a slot 221 formed in a shiftable bar 222. A spring 223 interconnects the ends of the shifter levers so that each lever acts as an abutment to hold one end of the spring during movement of the other lever. The bar 222 has a notch 224 cut in one face thereof for engagement by the head 225 projecting from the arm 215. The notch is provided with clearance so that when the control lever 205 is moved upward as viewed in Figure 8, the head 225 will leave the abutment 224 and cause the arm 215 to shift only the lever 209 and thereby engage clutch 183 to effect changes in feed rate without disturbing the neutral position of the clutch 172. Upon downward movement of the manual control lever 205, the head 225 on arm 215 will move the bar 222 to the left which will cause the lost motion between the pin 220 and the slot 221 to be taken up first and then will cause shifting of the clutch 172 into engagement with gear 160. At the same time the hook-shaped portion 214 will move away from the pin 213 carried by lever 209 with the result that the feed clutch 183 will remain disengaged during engagement of the clutch 172.

Figure 17:
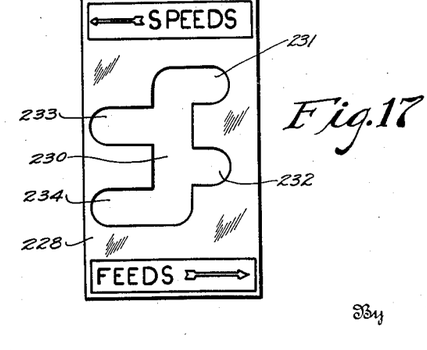
Figure 17 is a detailed view of the interlock plate.

A spring pressed detent 226 is provided for holding the lever 202 in a neutral position and this detent engages a V-shaped groove 227 formed in the arm 202. As shown in Figure 6, the notch 227 is sufficiently long to maintain engagement with the detent during up and down movement of the shaft 201. It will now be seen that the lever 205 has two directions of movement, one of which is to select whether the rate change is to be made in the feed transmission, or in the speed transmission and the other movement determines the manner of effecting the rate change such as by progressive increase or progressive decrease. To facilitate this selection and prevent as far as possible mistakes by the operator, a sliding plate 228 is mounted in the end of a projecting boss 229. This plate has an irregular shaped opening in it, as shown in Figure 17, comprising a center slot 230, a pair of lateral extensions 231 and 232 on one side, and a second pair 233 and 234 on the other side but the latter pair is arranged alternately with respect to the first pair. The boss 229 has a cover plate 235 which, as shown in Figure 9, has an H-shaped slot cut therein, but when the plate 228 is in the position shown in Figure 9 the lever 205 can only be moved to the right, which limits the function of the control lever 205 to engagement and disengagement of the feed rate control clutch 183. The plate 228 may be manually moved upward to align the slots 233 and 234 with the slots in the left half of the H-plate and disalign the slots 231 and 232 with the slots in the right half of the H-plate thereby permitting movement of the lever 205 only in a direction to engage the speed rate control clutch 172. As shown in Figure 8, a spring pressed detent 236 serves to hold the plate 228 in either one of its two positions.

To further facilitate shifting of the gears in the speed transmission, there has been provided a power means for jogging the gears in the speed train, that is, imparting a slow, steady rotation thereto during the shifting movement. This power means is so arranged as to become automatically effective when the clutch 172 is engaged, but is ineffective when the feed clutch 183 is engaged. To this end the shaft 32 is provided with a bevel gear 237 which, as shown in Figure 2, is connected to the shaft by means of a friction clutch 238. The gear 237 meshes with a bevel gear 239 mounted on the end of shaft 240, this shaft being connectible by the shiftable clutch 241 to the gear couplet 242 which is mounted for free rotation on the shaft. The couplet 242 comprises a relatively large gear 243 and a relatively smaller gear 244, these gears being adapted to be selectively engaged by gear 245 or gear 191. In other words, when the reverser gear 191 is shifted to the left as viewed in Figure 13, it also intermeshes gear 245 with gear 243 to make possible a relatively slow jogging of the speed train and when shifted to the right from the position shown, the gear 191 will also be intermeshed with gear 244 to effect a faster rate of jogging to the spindle train. These gear connections will be reversed every time the reverser gear 191 is shifted, but power jogging of the train will be determined by the clutch 241. This clutch is only engaged when the speed rate control clutch 172 is engaged. This result is automatically accomplished in the following manner.

The clutch 241, as shown in Figure 6, has an annular groove 246 into which fits a pin 247 carried by one arm of the pivoted bell crank 248. The other arm 249 of the bell crank is connected by a link 250 to a second swinging arm 251 mounted in parallel relation to the arm 249 so that the link 250 travels in substantially a straight line. The arm 251 is pivoted on the pin 252 which is threaded in a fixed part 253 of the column. The arm 251 carries a pin 254 which rides in a cam slot 255 formed in the bar 222 so that upon movement of the bar to the left the link 250 will effect oscillation of the bell crank 248 and engage clutch 241. The bar 222 is guided in a slot 256 formed in the part 253 and held in place by a cap 257 and screws 258. The cap 257 also has a bore through which the rod 259 slides, the other end of the rod being fixed in a lug 260 carried by the bar. A spring 261 surrounds the rod 259 so as to normally urge the bar 222 toward the right. From Figure 8 it will now be seen that the bar 222 is moved toward the left only when the clutch 172 is engaged and therefore the clutch 241 is only engaged when the speed clutch 172 is utilized. The lost motion in the slot 216 makes it possible for the clutch 241 to be engaged and cause power rotation of the gears before the clutch 172 is engaged to rotate the cams and cause shifting of the gears.

The bar 222 has another lug 262 integral therewith which is adapted to engage any one of four equally spaced notches 263 formed in the member 264 which is rotatable with shaft 155. This serves as an automatic positive detent and since it is interconnected by means of the bar 222 and shifter arm 216 with the clutch 172, it will be apparent that if the lever 205 is returned to a neutral position before the control cam carried by the shaft 155 has completed its movement to the next position, that the lug 262 will engage the periphery of the member 264 to prevent the spring 265 from shifting the bar toward the right and effecting disengagement of the shaft 172. But as soon as the member 264 has rotated to a position that the lug 262 begins to enter one of the grooves 263, it will permit gradual disengagement of the clutch 172 and as the movement of the member 264 continues the lug 262 will seat itself in the groove and act as a positive lock to prevent further rotation and also will effect complete disengagement of the clutch 172 to prevent further application of power to the cam. It will thus be seen that these parts cooperate with one another to disconnect the power at the proper time and positively lock the cam in its various positions.

The feed and speed rate control clutches and the reverser gear are also connected for operation from the front of the machine. To this end the shaft 201 has a ball-ended projection 266 which is operable to reciprocate shaft 201 and thereby cause oscillation of lever 199. The projection 266 is also operable to rotate shaft 201 but it will be noted independent of arm 202. This is to permit side movement of either front or rear control lever without causing movement of the other, which is necessary because the interlock plate 228 associated with each lever may not be in the same position.

Operation of the speed and feed control clutches by shaft 201 is effected in the following manner. A sleeve 329 is fixed against axial movement in bearing 330 but is splined on shaft 201 for rotation therewith. The lower end of sleeve 330 has an arm 215' secured thereto which is exactly the same shape as arm 215 shown in Figure 8 and which lies just above this arm whereby upon rotation of shaft 201 either clutch shifter fork may be moved without interference from arm 215. Similarly, arm 215 may shift the clutches without interference from arm 215'.

Axial movement of shaft 201 will effect operation of lever 199, the shaft moving relative to the sleeve 329. The ball-ended projection 266 of shaft 201 fits into a bore 267 formed in the end of lever 268 fixed with shaft 269. The shaft 269 is reciprocable as well as rotatable to impart the same movements to the shaft 201. The shaft 269, as more particularly shown in Figures 9 and 14, has a first annular grooved member 270 fixed therewith which is engaged by a ball-ended lever 271 fixed with the vertically rotatable rod 272. This shaft also has a ball-ended lever 273, Figure 15, engaging a notch in shifter rod 274 which in turn has a notch 275 engaged by the ball-ended lever 276 carried by a second vertical rod 277.

The rods 272 and 277 are splined as shown in Figure 9 and extend through a pair of ball-ended levers 278 and 279, Figure 11, which levers are carried by a housing 280 fixed to the rear of the knee 22. The lever 278 projects into a slot formed in the rod 281 which rod has a second slot 282, as shown in Figure 12, into which fits the ball-ended lever 283 fixed with the horizontal rod 284.

The arm 279 splined on shaft 277 engages a groove 285 formed in the side of shiftable rod 286 which rod has a second slot 287 cut in the top thereof for receiving the ball-ended lever 288 carried by a second horizontal rod 289.

The rods 284 and 289 have a splined connection with rotatable sleeves 290 and 291 carried by the saddle 24 and each sleeve has eccentric pins 292 and 293 respectively but the pin 293 is displaced 90 degrees relative to the pin 292 so that upon rotation of the member 294 the sleeve 291 will be rotated but the sleeve 290 will remain stationary. On the other hand upon vertical movement of the member 294 the pin 293 will effect oscillation of sleeve 290 but the pin 292 will ride in the slot 295 without effecting rotation of sleeve 291. The member 294 is connected through the ball-ended slot connection 295 to the universally movable lever 297 which is mounted in the same manner as control lever 205, and also is provided with guide plates similar to those associated with the lever 205. A detent plunger 298 serves to hold the lever in a neutral position with respect to its movement in a horizontal plane. By means of this construction it will be seen that the operating control mechanism may be manipulated from either the front of the machine or from a control station at the side of the machine.

To further facilitate the shifting of gears in the speed transmission, the cam paths in the various control cams 67, 70, 73 and 75 are so formed as to disengage their respective gears in a predetermined sequence and re-engage them in their new positions in a second sequence which is in fact a reverse of the first sequence. In other words, the gears are disengaged in successive order from the last shaft of the transmission to the primary shaft 32, and then engaged in reverse order, whereby at an intermediate point of time in the shift the jogging power is only rotating shaft 32 and when the power shift has been completed with respect to the shiftable gears carried thereby, the shaft 43 will be rotating to assist inter-meshing of the gears carried by the couplet 50 which gears at this moment will be stationary. Upon completion of the shifting of couplet 50 the shaft 49 will be power jogged thereby causing rotation of shaft 56 to facilitate inter-meshing of either of the gears of couplet 59 with respect to the stationary gears 62 and 63. The formation of the cam paths to effect these results is illustrated more particularly in Figure 18. The cam path 299 formed in the cam 70 controls the position of the gear couplet 44. This path is shown in expanded view in Figure 18 and the center line 300 represents the neutral position of the couplet 44. The ordinate 301 indicates the lowest speed of the transmission and since the cam path is to the right of the neutral line, the gear 45 will be engaged.

Figures 18, 19:
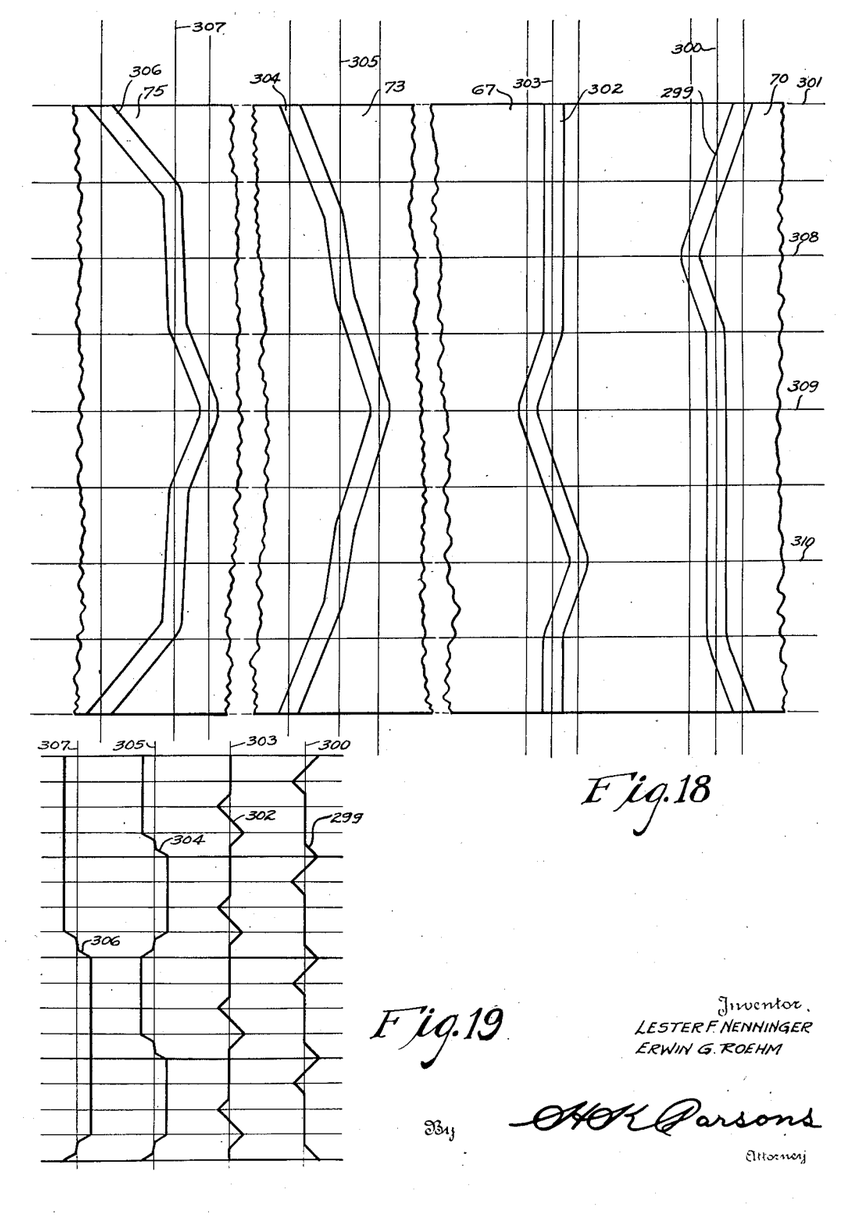
Figure 18 is an expanded view showing the cam paths in the control cams for the spindle transmission.
Figure 19 is a diagrammatic view showing the whole sequence of changes effectible in the spindle transmission.

The cam path 302 of cam 67 positions the couplet 38 in a neutral position for the lowest speed because it will be noticed that the cam path is central of the neutral line 303 for the lowest speed. The cam 73 in this figure has a cam path 304 which is drawn with respect to its neutral line 305 and for the lowest speed of the machine the gear 52 is engaged. The cam 75 has a cam path 306 which is drawn with respect to its neutral line 307 and for the lowest speed the gear 61 is engaged with gear 63.

Upon rotation of the cams 67 and 70 a quarter of a revolution, the shifter fork pins will lie on the ordinate 308 which will result in gear 45 being withdrawn from mesh with gear 47 and gear 46 moved into mesh with gear 48. It will be noted that as soon as gear 45 is withdrawn from mesh with gear 47 that shaft 43 will stop and the jogging power will only rotate shaft 32 thereby rotating gear 46 at a slow, steady rate relative to gear 48 to facilitate inter-meshing thereof. Due to the intermittent gearing described in connection with the cams, the cams 73 and 75 will not be rotated and therefore the respective gears connected therewith will remain in the position shown by the ordinate 301.

Upon further rotation of cams 67 and 70 through another quarter revolution the shifter fork pins will be on a line with ordinate 309, thereby moving the couplet 44 to a neutral position and engaging gear 40 of couplet 38 with gear 42. Further rotation of cams 67 and 70 through another quarter revolution will position the shifter fork pins on the ordinate 310, thereby withdrawing gear 40 and shifting gear 39 into mesh with gear 41. The first set of four speeds has now been completed. Upon rotation of the cams 67 and 70 through another quarter of a revolution the gear couplets 38 and 44 will again be positioned in accordance with ordinate 301, but during the quarter of a revolution the cam 73 has been rotated through a half of a revolution due to the intermittent gear ratio which means that the shifter fork pin has moved from the ordinate 301 down to the ordinate 309, during the time that the pin in cam path 299 has moved from ordinate 301 to 308. By following the cam path 304, it will be seen that during the first part of the movement the couplet 50 has been moved to a neutral position where it tarries for approximately one-sixth of a revolution, during which time the gear 45 has moved sufficiently to inter-mesh with the gear 47 and cause rotation of the shaft 43 so that gear 47 is now rotating and gear 51 which is to be inter-meshed therewith will be stationary. This makes it possible during the final sixth of a revolution of cam 73 to move the non-rotating gear 51 into mesh with the slow rotating gear 47. This same procedure is followed with the other shifts made by gears 51, 52, 60 and 61. In other words, the last two gear couplets are first withdrawn to a neutral position and then the first shift in connection with shaft 32 is sufficiently completed to cause rotation of the remaining shafts in the order in which the connections are made. The diagram in Figure 19 shows the complete sequence of shifts and it will be noted that the gears are withdrawn in the order previously explained regardless of direction.

An interlock mechanism has been provided which positively locks out operation of the speed change mechanism during rotation of the spindle.

Referring to Figures 1 and 2 the machine is provided with a starting lever 316 supported by shaft 317 which has integral crank 318 connected by link 319 to pivoted shifter fork 320. This fork shifts the main clutch 33 which controls rotation of the spindle. The shiftable member 321 of the clutch has a cone-shaped surface 322 which engages a similar shaped fixed surface 323 when moved to the disengaged position shown in Figure 2, thus constituting a brake.

Interconnected with the pivoted fork 320 are a pair of links 324 and 325, each pivotally connected to the interlock member 326. This member has a bolt 327 in the end thereof which has a cone-shaped end 328 which is raised by the link 324 upon engagement of the main clutch into a position opposite the end of bar 222, Figure 6, to prevent longitudinal movement thereof and thereby prevent engagement of clutch 172.

When the main clutch is disengaged, the member 326 is moved downward to the position shown in Figures 2 and 6 so that upon shifting of bar 222 the beveled end 329 thereof will act on the end of bolt 327 to cam member 326 downward to cause the link 325 to effect sufficient disengagement of the brake 321 to permit jogging the gear train. In doing this the bar 222 rides over the top of screw 327 to prevent engagement of the main clutch. Thus the member 326 interferes with member 222 to prevent operation of the rate changer when the main clutch is engaged and the member 222 interferes with the member 326 to prevent engagement of the main clutch when the rate changer is being operated.

The purpose of the two speeds for the jogging train is to insure peripheral gear speeds which are substantially uniform regardless of gear diameters. It will be noted from Figure 2 that gear 60 is larger in diameter than gear 61. The gear 60 is only moved during progressive increase of rate and then only once. Also the gear 61 is intermeshed with gear 63 only once and that is during progressive decrease in rate. Further, at the time that the gear 60 is moved into mesh with gear 62, the preceding train is set to produce its lowest speed. At the time that the gear 61 is moved into mesh with gear 63, the preceding train is set to produce its highest speed. This means that if the jogging of shaft 32 is at the same rate during both shifts that the gear 61 will be rotated at a higher rate than gear 60. But due to the wide difference in diameter, the peripheral speed of the teeth of gear 60 would still be considerably greater than gear 61. Therefore in order to compensate for this, the jogging speed is lower when the gear 60 is being shifted than it is when the gear 61 is being shifted.

There has thus been provided an improved mechanism for the purposes disclosed, which is simple in construction, and which enhances the operation and control of milling machines.

What is claimed is:

1. A machine tool having a spindle, a prime mover, a variable speed transmission coupled to the spindle, means for coupling the transmission to the prime mover, a branch train continuously actuated by the prime mover, a power rate change mechanism for said transmission, means to reversely connect said mechanism to the branch train for increasing or decreasing the rate of rotation of the spindle, a second train connected to the variable speed transmission, and means to connect the branch train to said second train when said coupling means is disconnected for effecting rotation of the transmission during operation of the power rate change mechanism.

2. In a machine tool having a variable speed shiftable gear transmission for variable actuation of a part, the combination of mechanism for changing the rate of said actuation including a source of power, power operable means to slowly rotate the gears, power operable means for shifting the gears, and a single control for connecting each of said means to said source of power sequentially in the order named whereby the gears will be slowly rotated during power shifting thereof.

3. In a machine tool the combination with a prime mover, a variable speed gear transmission and a final part to be actuated thereby, of means to couple and uncouple the transmission with the prime mover, said means including a driving clutch and an opposed brake, power operable means for jogging the transmission independently of said clutch, additional power operable means for shifting the gears of the transmission, and a single control operable to effect sequentially the release of said brake, coupling of the jogging means to the prime mover, and coupling of the power shifting means to the prime mover, and means to prevent operation of the control when the transmission and prime mover are coupled.

4. In a machine tool transmission, the combination of a power shaft, a second shaft, means to couple the second shaft to the power shaft for rotation thereby in one direction, a third shaft, means to couple the third shaft to the power shaft for rotation thereby at one speed, a gear mounted on the power shaft, and means to shift the gear to effect reverse rotation of the first shaft and a change of rate in the rotation of the second shaft.

5. In a machine tool transmission, the combination of a power shaft, a second shaft, means to couple the second shaft to the power shaft for rotation thereby in one direction, a third shaft, means to couple the third shaft to the power shaft for rotation at one speed, a gear mounted on the power shaft, means to shift the gear to effect reverse rotation of the first shaft and a change of rate in the rotation of the second shaft, final transmissions actuable by the first shaft and the second shaft respectively, and clutches sequentially engageable to couple the first and second shaft to their respective final transmissions.

6. In a machine tool transmission, the combination of a power shaft, a second shaft, means to couple the second shaft to the power shaft for rotation thereby in one direction, a third shaft, means to couple the third shaft to the power shaft for rotation at one speed, a gear mounted on the power shaft, means to shift the gear to break said couplings and effect reverse rotation of the first shaft and a change of rate in the rotation of the second shaft, final transmissions actuable by the first shaft and the second shaft respectively, clutches sequentially engageable to couple the first and second shaft to their respective transmissions, and a single control lever for sequentially shifting said clutches.

7. In a machine tool transmission the combination of a power shaft, a second shaft, means to couple the second shaft to the power shaft for rotation thereby in one direction, a third shaft, means to couple the third shaft to the power shaft for rotation at one speed, a gear mounted on the power shaft, means to shift the gear to recouple the shafts for reverse rotation of the first shaft and a change of rate in the rotation of the second shaft, final transmissions actuable by the first shaft and the second shaft respectively, clutches sequentially engageable to couple the first and second shaft to the respective transmissions, a single control lever for sequentially shifting said clutches, and shifting said gear, said lever having a movement in one direction for shifting the gear and a movement in a second direction for sequentially shifting said clutches.

8. In a machine tool transmission having a first branch and a second branch selectively connectible to a final part for actuation thereof, the combination of separate clutches for effecting the respective connections, and interlock means to prevent simultaneous engagement of said clutches including a first part for shifting one clutch and a second part connected for movement with the second clutch, one of said parts having two positions in the first of which it interferes with the movement of the other part, and in the second of which it is interfered with by the other part.

9. In a variable speed transmission, a first shaft having fixed gears thereon, a second shaft having gears thereon selectively shiftable into mesh with said fixed gears to vary the rate coupling between said shafts, a third shaft having gears thereon selectively shiftable into mesh with said fixed gears to vary the rate coupling between the first shaft and the third shaft, means to couple one of the last named shafts to a source of power, and means to neutralize the shiftable gears on one shaft during shifting of the gears on the other shaft.

10. In a variable speed gear train including a prime mover, a driven part and a plurality of intervening gear couplets selectively meshable to provide gear trains for driving the part from the prime mover at different rates, the combination with a rate change mechanism for said transmission including a part rotatable in one direction to shift said gear couplets and progressively increase the rate of drive of the driven part and shiftable in an opposite direction to progressively decrease said rate of drive, of an auxiliary actuating mechanism for the gear train during rate change comprising means to operate the train at one rate during shifting to effect an increase in the rate of drive effected by the variable speed gear train, and alternative means to actuate the train at a different rate during shifting to effect a decrease in the power rate transmittable by the variable speed gear train to the given part.

11. In a milling machine having a feed transmission and a speed transmission, and separate power rate change mechanisms for each transmission, a control lever for connecting said mechanisms to power, said lever having different movements for effecting the different connections, and preselecting means positionable to confine the movements of the lever to the control of one of said mechanisms.

12. In a milling machine having a feed transmission and a speed transmission, separate power operable rate change mechanisms for each transmission, and individual clutches for connecting each mechanism for power actuation, a control lever having a direct connection with one of said clutches, and a lost motion connection with the other of said clutches, and means operable by the lever during take-up of said lost motion to connect a power jogger to the transmission for slow rotation thereof during effectuation of rate changes therein.

13. The improvement in a milling machine having a cutter spindle and a prime mover, a transmission for variably coupling the prime mover to the spindle, including shiftable train of gears of different diameters selectively inter-engageable with other gears for varying the rate of spindle rotation, and power operable means for shifting said gears, comprising an auxiliary power operable mechanism for slowly rotating the gears during shifting to facilitate inter-engagement thereof, said mechanism including means for effecting one rate of rotation of the shiftable gear train when a smaller gear is to be engaged, means for effecting another rate of rotation when a larger gear is to be engaged.

14. The improvement in a milling machine having a rotatable part and a prime mover, a transmission for coupling the prime mover to the part including groups of serially arranged different sized shiftable gears selectively movable into engagement with other gears for selectively establishing different series of gear trains to vary the rate of rotation of the part, and power operable rate change mechanism for shifting the gears, comprising an auxiliary power operable train for slowly rotating the shiftable gears during shifting movement thereof, said train including means for effecting a slow rate of rotation of the transmission when large gears are shifted, and a faster rate of rotation when small gears are shifted, whereby the peripheral speeds of all shiftable gears will be substantially the same during intermeshing thereof.

15. In a machine tool having a movable part and a prime mover for actuation thereof, the combination of motion transmitting means including a plurality of shiftable motion transmitting members for variably coupling the prime mover to the part, means including a power train for shifting said members to change the rate coupling between the prime mover and the part, a second power train for imparting a relatively slow rate of actuation to said members during shifting thereof, a control having an operative and an inoperative position, and means actuable by said control upon movement to an operative position to connect said power trains to the prime mover.

16. In a machine tool, the combination with a variable speed shiftable gear transmission, of means to shift said gears including a power train, means to slowly rotate said gears during shifting, including a second power train, a common source of power, a control, motion transmitting means operable by the control for coupling one of said trains to power and other means operable by said motion transmitting means for coupling the other train to said source of power.

17. In a machine tool transmission, the combination with a source of power, of a first branch transmission, a second branch transmission, a shiftable gear couplet movable to a first position for connecting said transmissions to the power source for actuation thereby, into a second position for reversely connecting one branch transmission to the source of power and connecting the other branch transmission for actuation by the source of power at a different rate, and means for shifting said gear couplet.

18. In a machine tool the combination of a transmission train including a device movable between driving and motion interrupting positions, a power operable shifter for said device, a power train connectible for operation of said shifter, a controller for effecting alternative connections of said power train and shifter respectively for the driving and interrupting positions of said device, and means associated with said transmission and operative in accordance with the operation of said controller to effect a period of relatively slow transmission speed during movement of said device to driving position.

19. In a machine tool the combination of a transmission train including a device movable between a normal speed driving position and another position, a power operable shifter for said device, a power train connectible for operation of said shifter, a controller for effecting alternative connections of said power train and shifter respectively for the different positions of said device, and means associated with said transmission and operative in accordance with the operation of said controller to effect a substantial period of relatively slow transmission speed during movement of said device to said normal speed position.

LESTER F. NENNINGER.
ERWIN G. ROEHM.